United States Patent [19]
Flaherty et al.

[11] Patent Number: 5,734,727
[45] Date of Patent: Mar. 31, 1998

[54] SUNROOF ASSEMBLY NOISE ATTENUATION SYSTEM

[75] Inventors: B. Michael Flaherty, Fort Wayne, Ind.; William C. Brown, Temperance, Mich.

[73] Assignee: ASC Incorporated, Southgate, Mich.

[21] Appl. No.: 484,560

[22] Filed: Jun. 7, 1995

[51] Int. Cl.$^6$ ............................................. G10K 11/16
[52] U.S. Cl. ..................... 381/86; 296/216; 296/217; 296/223; 381/71.4; 381/71.2
[58] Field of Search ........................ 296/216, 217, 296/223; 381/71

[56] References Cited

U.S. PATENT DOCUMENTS

| | | | |
|---|---|---|---|
| 4,278,922 | 7/1981 | Grebe | 318/264 |
| 4,280,330 | 7/1981 | Harris et al. | 62/3.3 |
| 4,481,450 | 11/1984 | Watanabe et al. | 318/444 |
| 4,556,835 | 12/1985 | Vogel et al. | 318/663 |
| 4,770,035 | 9/1988 | Kolkebeck et al. | 73/195 |
| 4,797,924 | 1/1989 | Schnars et al. | |
| 4,835,449 | 5/1989 | Huehn | |
| 4,852,469 | 8/1989 | Chuang | 454/75 |
| 4,862,750 | 9/1989 | Mice | 73/861.24 |
| 4,914,367 | 4/1990 | Niewiadomski et al. | 318/663 |
| 4,934,754 | 6/1990 | Cioffi | |
| 4,986,598 | 1/1991 | Yamauchi et al. | |
| 5,045,765 | 9/1991 | Wissler | 318/382 |
| 5,069,501 | 12/1991 | Baldwin et al. | |
| 5,092,651 | 3/1992 | Baldwin et al. | |
| 5,214,707 | 5/1993 | Fujimoto et al. | |
| 5,267,323 | 11/1993 | Kimura | |

FOREIGN PATENT DOCUMENTS 1946161  1/1978  Germany.

*Primary Examiner*—Forester W. Isen
*Attorney, Agent, or Firm*—Harness, Dickey & Pierce, P.L.C.

[57] ABSTRACT

A sunroof noise attenuation system employs a sunroof assembly having an actuator driven pane movable in response to a sensor signal. In another aspect of the present invention, a pair of vibration sensors are mounted to the sunroof tub. In a further aspect of the present invention, an electronic control unit is electrically connected between a sensor and the actuator. In still another aspect of the present invention, a speed sensor is employed. A method of operating the sunroof assembly is also described.

19 Claims, 4 Drawing Sheets

SUNROOF ASSEMBLY NOISE ATTENUATION SYSTEM

BACKGROUND AND SUMMARY OF THE INVENTION

This invention relates generally to automotive vehicle sunroofs and specifically to a sunroof assembly noise attenuation system for use in an automotive vehicle.

It has become commonplace to employ sunroof assemblies in automotive vehicle roof systems. Such sunroofs offer sunlight access through a fixed vehicle roof opening when a sunroof pane is disposed in either an open or closed position and an opaque sunshade is openly slid. Furthermore, open air motoring access is provided through the sunroof area when the sunroof pane is fully opened. Thus, increased ventilation is also achieved.

Most conventional sunroof assemblies have a sunroof tub, an electric motor, a cable-driven drive mechanism and the sunroof pane. A driver-accessible switch is also provided for selectively energizing and de-energizing the electric motor in a manual manner. These conventional sunroof assemblies move the sunroof pane between a fully closed position, generally flush with the exterior of the vehicle roof, a fully open position, either stowed below or above the stationary roof, various somewhat linear positions between the closed and open positions, and a tilting vent position wherein the rearmost edge of the pane is upwardly pivoted.

However, many traditional sunroof assemblies have a wind buffeting or booming problems at certain vehicle speeds. In other words, an objectionable noise is perceived by the vehicle occupants when the sunroof pane is fully opened and the vehicle is moving at various speeds. For example, tests on one vehicle found these noise levels to exceed 95 decibels (dB) when the vehicle is traveling above 35 miles per hour. It has further been found that such objectionable wind buffeting noises are especially prevalent on luxury vehicles, thereby leading to many customer complaints.

It is believed that the amount of wind buffeting is affected by the fore and aft sunroof opening position within the vehicle, the hands-through-opening size (i.e., the sunroof opening area), passenger compartment interior volume, and the windshield rake or angle. The interior volume of the passenger compartment becomes a sound generator due to the exterior air rushing into or past the passenger compartment and vibrating at the natural frequency of the interior air volume. This interior air volume and the associated air flowthrough can be controlled by manually opening and closing quarter panel or rear door windows or the like. However, such manual window actuation is inconvenient and annoying to the vehicle driver while also inconveniencing rear seat passengers. This manual side window adjustment is also time consuming and often not optimized. It is also believed that the front header radius and the transition from the windshield rake to the fore and aft roof sweep affect the flow of exterior air over the sunroof opening. However, this windshield rake and transition are dictated by styling needs and not easily changed to account for this wind buffeting situation, particularly when such styling changes would affect the common non-sunroof vehicle. Similarly, the fore and aft sunroof opening position is optimally placed over the front seat occupants based on the final customer expectations and sunroof functions.

Traditionally, the sunroof wind buffeting problem has been reduced by employing wind deflectors or the like to each vehicle, thereby aerodynamically controlling external air flow over the sunroof opening. Examples of such wind deflectors are disclosed within U.S. Pat. No. 4,986,598 entitled "Wind Deflector for a Sunroof" which issued to Yamauchi, et al. on Jan. 22, 1991, and U.S. Pat. No. 4,934,754 entitled "Wind Deflector for a Motor Vehicle Sunroof and Method of Attachment" which issued to Cioffi on Jun. 19, 1990. Nevertheless, these wind deflectors can undesirably block sunlight from entering through the sunroof opening. Furthermore, these wind deflectors must be sized and shaped for each individual vehicle since all vehicle types have differing aerodynamic and wind buffeting characteristics. Therefore, such add-on or mechanically operated wind deflectors provide a relatively expensive, obtrusive and undesirable solution for this significant and well recognized, but until now, unsolved problem.

In accordance with the present invention, the preferred embodiment of a sunroof assembly noise attenuation system employs a sunroof assembly having an actuator driven pane movable in response to a sensor signal. In another aspect of the present invention, a pair of vibration sensors are mounted to the sunroof tub. In a further aspect of the present invention, an electronic control unit is electrically connected between a sensor and an actuator. In still another aspect of the present invention, a speed sensor is employed. A method of operating the sunroof assembly is also described.

The sunroof assembly noise attenuation system of the present invention is advantageous over traditional methods by providing a relatively inexpensive and automatically operable system. The electronic control unit receives an input signal from the associated sensor and automatically causes energization and de-energization to the actuator. This causes the pane to move to an optimized position wherein the wind buffering noise is automatically reduced to an occupant-acceptable level. Not only does the present invention solve the wind buffeting problem but it also is extremely convenient by preventing the vehicle driver from having to otherwise divert his senses from driving the vehicle. Furthermore, unlike traditional wind deflectors, the present invention is not aesthetically obtrusive and can be easily tailored to each specific vehicle and/or vehicle platform through simple circuit or electrical control revisions. Moreover, the present invention reduces noise created during truck passing. Additional advantages and features of the present invention will become apparent from the following description and appended claims, taken in conjunction with the accompanying drawings.

DETAILED DESCRIPTION OF THE PREFERRED EMBODIMENT

Figure 1:
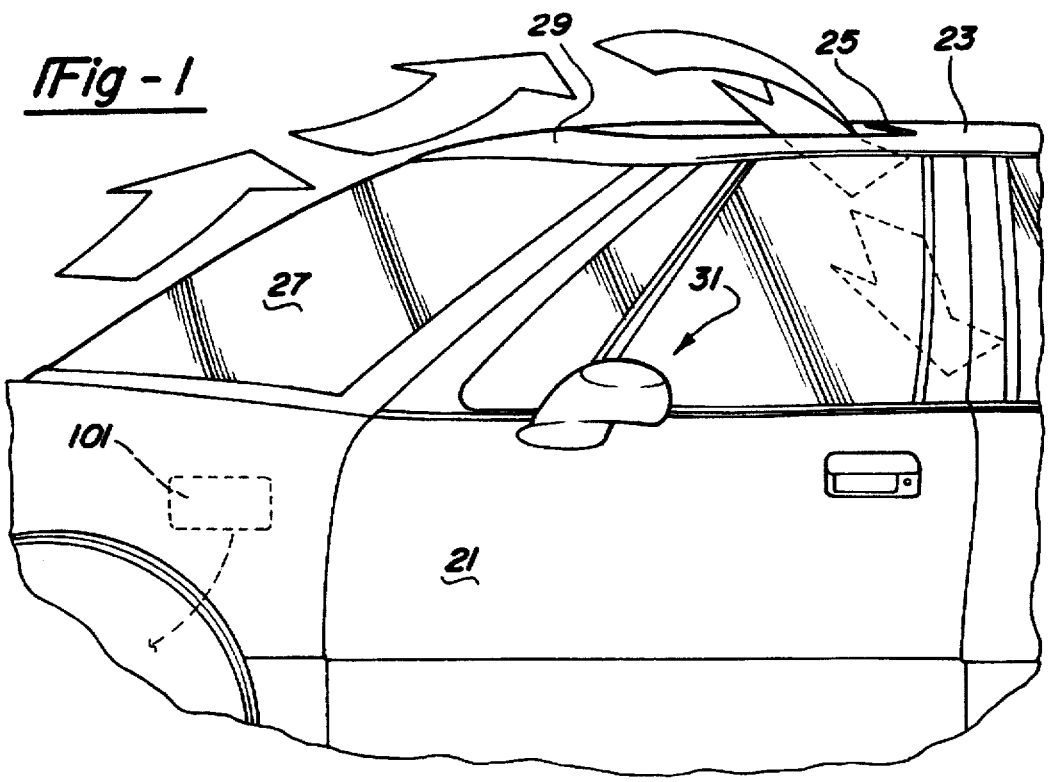
FIG. 1 is a side elevational view of an automotive vehicle employing the preferred embodiment of a sunroof assembly noise attenuation system of the present invention.

FIG. 1 shows an automotive vehicle 21 having a stationary metal roof 23 with a sunroof opening 25 therein. The exterior air flow, denoted by the enlarged arrows, aerodynamically moves along a windshield 27, past a front header 29, and through and past sunroof opening 25. When a sunroof pane is in a fully opened position and when the vehicle is traveling at high speeds, the exterior air flow pressure causes loud audible air vibrations within a passenger compartment 31 of the vehicle. This is especially prevalent due to the current styling trends wherein the stationary roof is often tipped forward so that the rear edge of the sunroof opening tends to further scoop external air.

Figure 2:
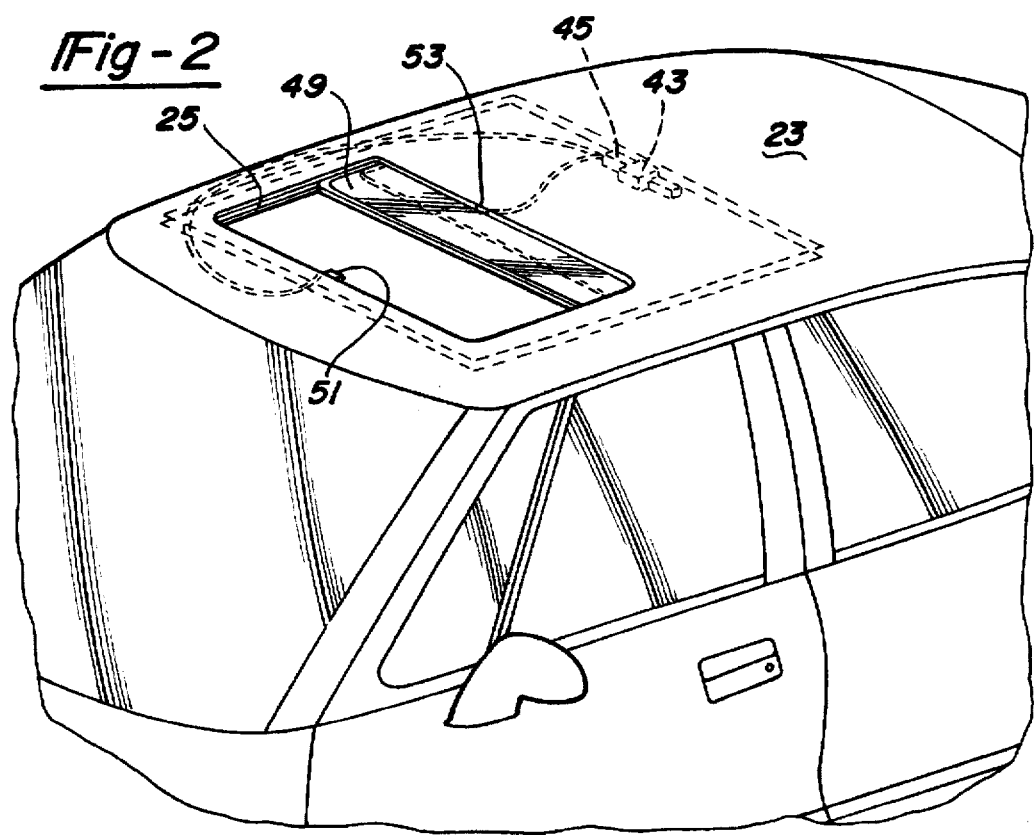
FIG. 2 is a perspective view showing the first preferred embodiment sunroof assembly noise attenuation system of the present invention.
Figure 3:
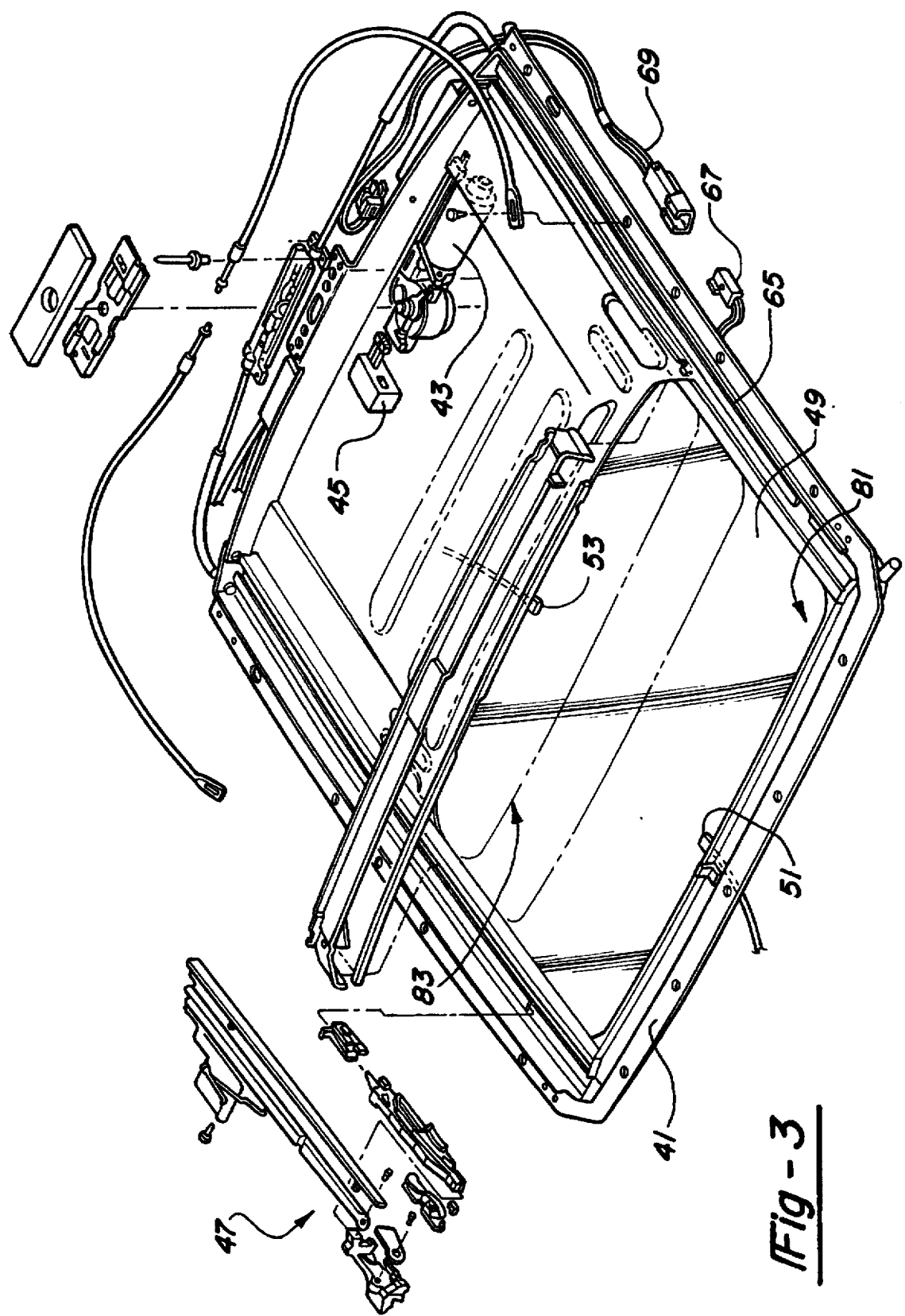
FIG. 3 is an exploded perspective view showing the first preferred embodiment sunroof assembly noise attenuation system of the present invention.
Figure 4:
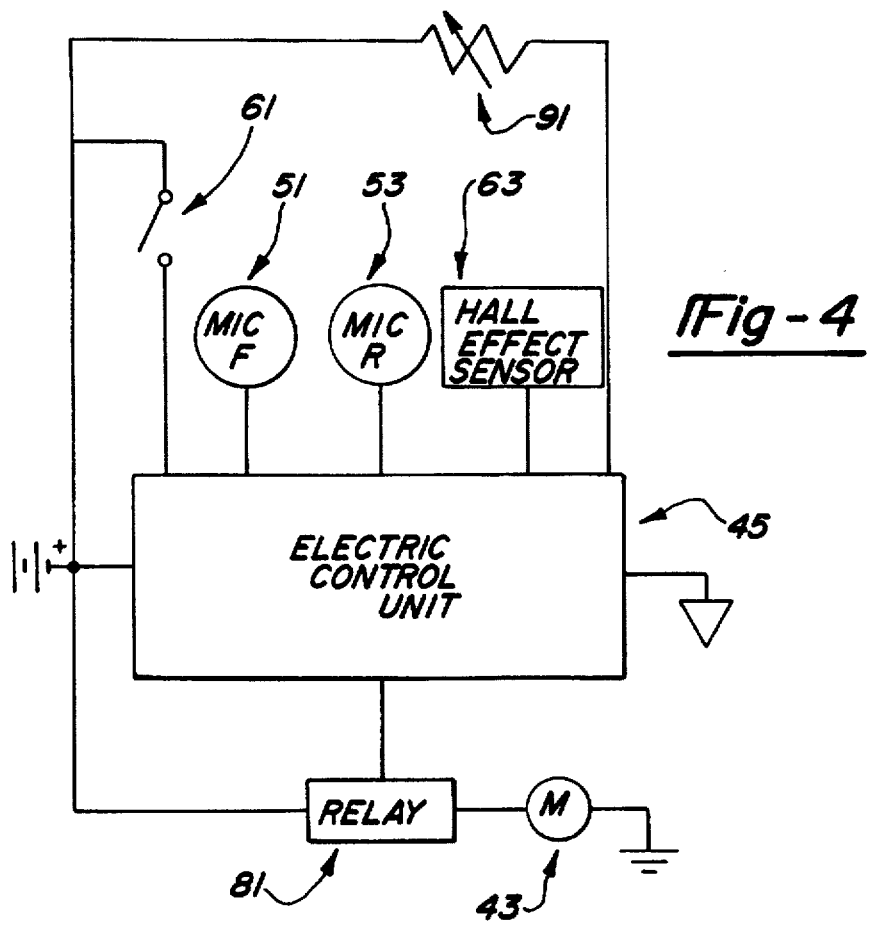
FIG. 4 is an electrical schematic diagram showing the first preferred embodiment sunroof assembly noise attenuation system of the present invention.

A first preferred embodiment of a sunroof assembly noise attenuation system of the present invention can best be observed by reference to FIGS. 2–4. The sunroof assembly of the present invention includes a sunroof tub 41, an actuator or electric motor 43, an electronic control unit 45, a pair of drive mechanisms 47, a sunroof pane 49, a front vibration sensor or microphone 51 and a rear vibration sensor or microphone 53. A driver-accessible, toggle or push/push switch 61 is electrically connected to electronic control unit 45 and is mounted to a headliner, overhead console, or sunroof tub 41. This switch 61 is a high current electrical switch. Sunroof tub 41, electric motor 43 and cable actuated drive mechanism 47 are of a fairly conventional nature.

A hall effect sensor 63 is attached to a track 65 for magnetically sensing the positioning of pane 49 and the coincidental movement of the driving cables. Hall effect sensor 63 further has an electrical connector pigtail 67 electrically connected to electronic control unit 45 through discrete wire circuits 69 and electronic control unit 45 printed circuit board circuits. Hall effect sensor 63 is of the type disclosed within U.S. Pat. No. 4,835,449 entitled "Sliding Roof Panel Control Apparatus" which issued to Huehn on May 30, 1989, which was assigned to the assignee of the present invention and is incorporated by reference herewithin.

Microphones 51 and 53 are mounted to sunroof tub 41 immediately adjacent to sunroof opening 25 so as to sense the wind buffeting-caused audible vibrations at the sunroof opening closest to the exterior of the vehicle while minimizing the effects of passenger compartment vocal and stereo sounds. These microphones 51 and 53 are electrically connected to electronic control unit 45. Therefore, electronic control unit causes a high current, reversible relay 81 to selectively energize, reverse polarity and also de-energize motor 43, thereby moving pane 49 between a fully closed position 81 and a fully open position 83, vice versa, and any selected position therebetween. Electronic control unit 45 can have a microprocessor based architecture, analog solid state type architecture, bipolars, or the like. In fact, the microphones and electronic control unit can be generally operated in accordance with the following U.S. patent numbers, which are all incorporated by reference herewithin but do not disclose, suggest or motivate a sunroof use: U.S. Pat. No. 5,267,323 entitled "Voice-Operated Remote Control System" which issued to Kimura on Nov. 30, 1993; U.S. Pat. No. 5,214,707 entitled "Control System for Controlling Equipment Provided Inside a Vehicle Utilizing a Speech Recognition Apparatus" which issued to Fujimoto, et al. on May 25, 1993; and U.S. Pat. No. 4,797,924 entitled "Vehicle Voice Recognition Method and Apparatus" which issued to Schnars, et al. on Jan. 10, 1989.

Figure 6:
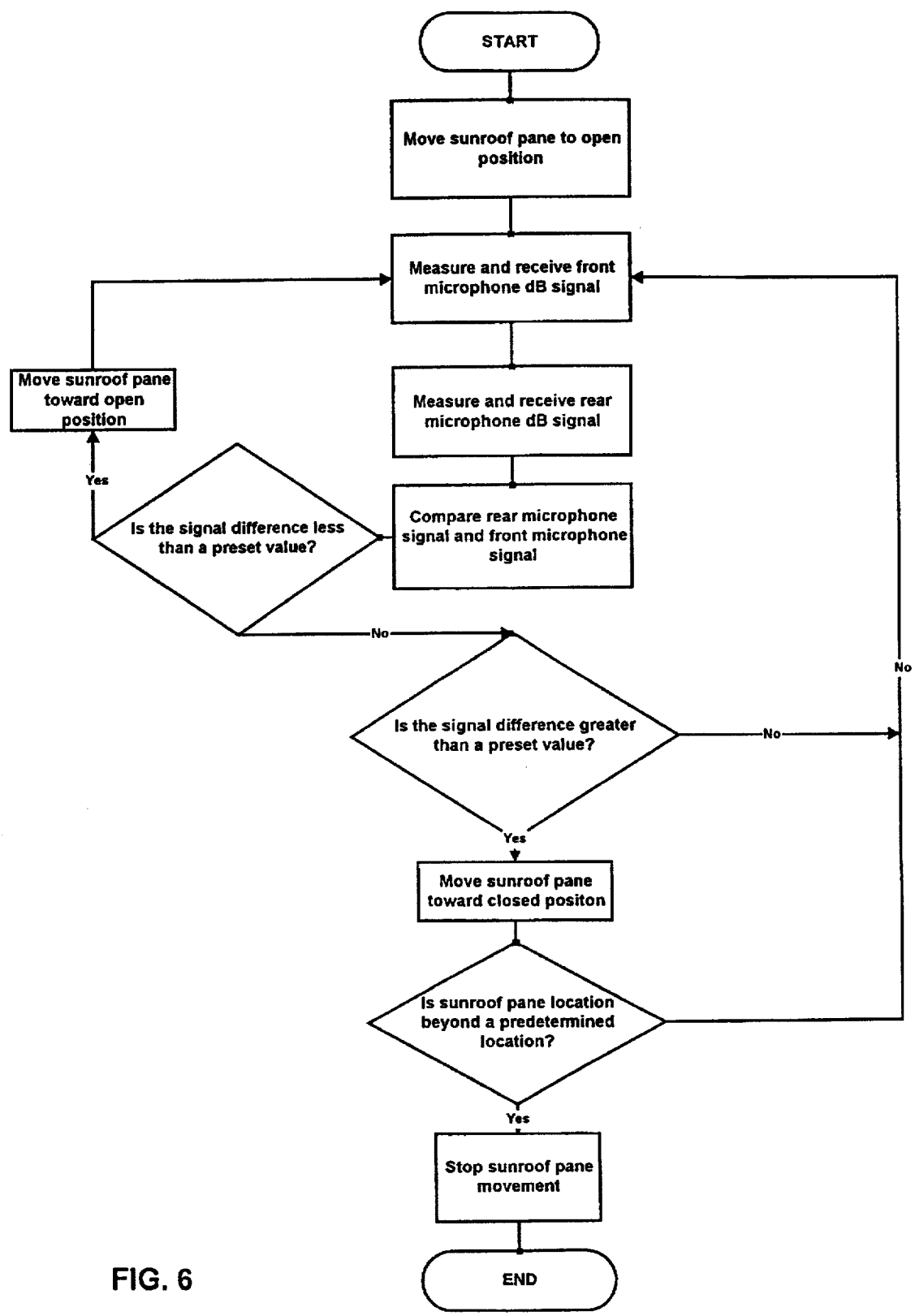
FIG. 6 is a flow chart showing the method of operating the first preferred embodiment of the electronic control unit of the present invention.

Referring to FIG. 6, this first preferred embodiment of the present invention sunroof assembly noise attenuation system operates as follows. First, the sunroof pane is opened to a predetermined position in accordance with the vehicle accessible switch. Next, the front and rear microphones measure the decibel levels incurred by wind buffering air vibrations. Third, these microphones both send microphone output signal values to the electronic control unit which then compares these values and determines a signal difference between such. Subsequently, the electronic control unit then determines if this signal difference is greater than or less than a preset value or values. If the signal difference is greater than the preset value, then the electronic control unit energizes the electric motor in a reverse direction, thereby closing the sunroof pane until the sound decibel level difference is optimized and the wind buffeting is reduced to its most acceptable level. However, if the optimized sunroof pane location is beyond a predetermined "automatically closed location", approximately half closed, then further closure is stopped by de-energization of the electric motor. If the decibel signal difference is less than a preset value or a range of values, thereby signifying a reduction in vehicle speed and the concurrent reduction or wind buffeting, the electronic control unit then re-energizes the electric motor to reopen the sunroof pane to a second optimized noise position. This decibel measuring and sunroof pane movement operation is continuously repeated. Thus, such a series of steps can be considered an active control system for attenuating sunroof noise relative to each specific vehicle. Even if there are vehicle-to-vehicle differences within the same body and platform style, the present invention will take such into account when attenuating the wind-buffeting noise.

Referring to FIG. 4, it is further envisioned that a high-level version of such a system of the present invention can incorporate a sensitivity switch 91, such as a variable rheostat or a potentiometer, which the driver can actuate to vary the preset decibel difference value. Of course, the control system of the present invention will also have to take into account federal motor vehicle safety standard (FMVSS) 118 dealing with automatic closure features, such as that of the present invention, which stops and reverses the motor direction if the closure force exceeds 22 pounds representing an occupant's hand or the like being placed thereagainst.

Figure 5:
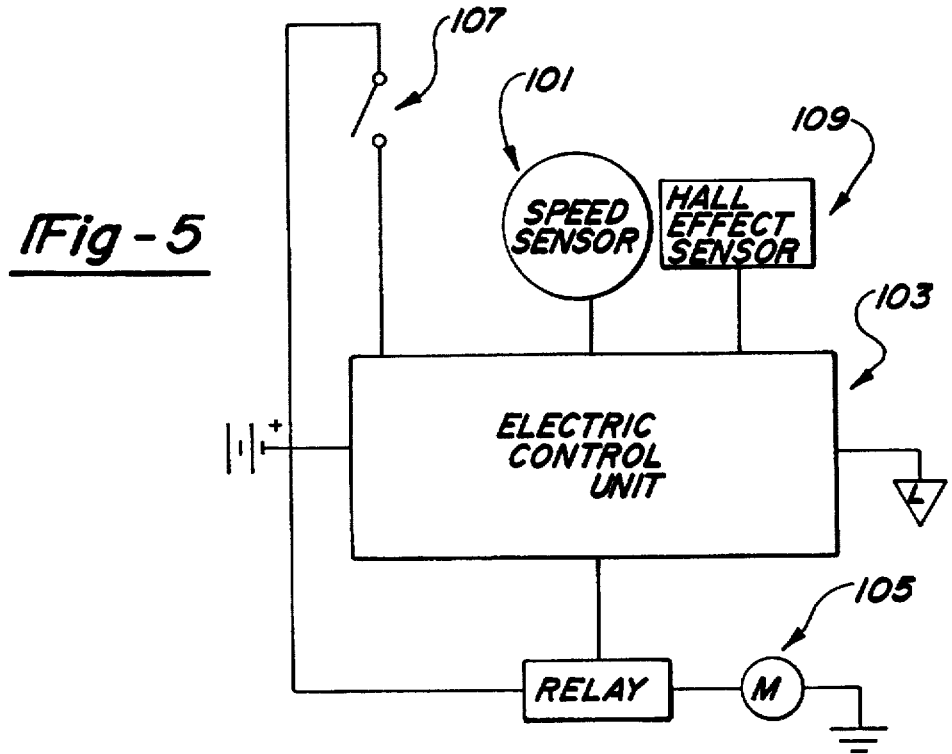
FIG. 5 is an electrical schematic diagram showing a second preferred embodiment of a sunroof assembly noise attenuation system of the present invention.

A second preferred embodiment of the present invention sunroof assembly noise attenuation system is shown in FIG. 5. In this embodiment, a vehicle speed sensor 101 is electrically connected to an electronic control unit 103. Speed sensor 101 is of the type currently employed in automotive vehicles such as those located within an anti-lock braking system or of other electromagnetic types commonly employed to sense rotational speed of a drive shaft in order to operate an instrument panel speedometer. Accordingly, this embodiment of the present invention is of an adaptive construction wherein electronic control unit 103 has preset values against which speed sensor signal output signals are compared. Thus, when the vehicle reaches a speed value X, the electronic control unit will compare such against the preset speed value and subsequently cause reverse energization of an electric motor 105 for moving the sunroof pane a predetermined distance Y toward the closed position. These present values would be based on specific vehicle testing. A driver-accessible switch 107 and hall effect sensor 109 are also provided. This second exemplary embodiment accomplishes most of the beneficial wind buffeting attenuation aspects of the first preferred embodiment while proving to be more cost effective by deleting the previously disclosed microphones.

Moreover, the microphone and electronic control unit system of the present invention can also be used to open and close a sunroof pane in response to vocal commands from the vehicle driver. This would require a voice recognition control system built into the electronic control unit and relocation of a microphone to an orientation facing the vehicle driver's mouth or, alternatively, an additional microphone. Such a voice recognition system can be used in addition to or instead of the wind buffeting attenuation control system.

While the preferred embodiments of this sunroof assembly noise attenuation system have been disclosed, it will be appreciated that various modifications may be made without departing from the present invention. For example, many other drive mechanisms and sunroof actuator constructions can be employed to achieve the same function and advantages of the present invention. Furthermore, other vibration sensors such as strain gauges or the like can be attached to the sunroof pane, stationary roof or other locations to sense audible or tactile vibrations caused by air movement. Moreover, the sunroof pane can also be moved to a pivoting vent position. Various circuits have been disclosed in an exemplary fashion, however, a variety of other circuits may of course be employed. It is intended by the following claims to cover these and any other departures from the disclosed embodiments which fall within the true spirit of this invention.

The invention claimed is:

1. A sunroof assembly for an automotive vehicle, said sunroof assembly comprising:
   a vibration sensor;
   a rigid sunroof panel;
   an actuator coupled to said panel and being electrically connected to said vibration sensor, said actuator selectively moving said panel in response to an output from said vibration sensor, said vibration sensor being disposed adjacent to said panel; and
   a sunroof tub having an opening covered by said sunroof panel when said sunroof panel is disposed in a closed position, said vibration sensor being mounted to said sunroof tub immediately adjacent to said opening.

2. The sunroof assembly of claim 1 wherein said panel is defined as a substantially transparent window pane closable to a substantially horizontal orientation.

3. The sunroof assembly of claim 1 wherein said sunroof panel solely moves in response to an output signal from at least one device taken from the group consisting of: (a) said vibration sensor, (b) a driver accessible sunroof positioning switch, (c) a sunroof positioning sensor, and (d) a vehicle speed sensor; said sunroof panel operating independent from a vehicle fan.

4. The sunroof assembly of claim 1 further comprising a second vibration sensor mounted upon a portion of said sunroof assembly.

5. The sunroof assembly of claim 1 wherein said vibration sensor includes an audible vibration sensing microphone, said actuator constantly moves said panel in response to said output of said vibration sensor.

6. A sunroof assembly for an automotive vehicle, said sunroof assembly comprising:
   a vibration sensor;
   a rigid sunroof panel;
   an actuator coupled to said panel and being electrically connected to said vibration sensor, said actuator selectively moving said panel in response to an output from said vibration sensor, said vibration sensor being disposed adjacent to said panel;
   an electrical circuit; and
   a sensitivity control switch electrically connected to said electrical circuit, said sensitivity control switch varying a preset decibel difference value, said vibration sensor also being electrically connected to said circuit.

7. The sunroof assembly of claim 6 further comprising a sunroof tub having an opening covered by said sunroof panel when said sunroof panel is disposed in a closed position, said vibration sensor being mounted to said sunroof tub immediately adjacent to said opening.

8. A sunroof assembly for an automotive vehicle, said sunroof assembly comprising:
   a rigid panel;
   a powered actuator coupled to said panel for selectively moving said panel;
   an electronic control unit electrically connected to said actuator for controlling energization of said actuator, said electronic control unit being disposed adjacent to said panel;
   said electronic control unit automatically causing said actuator to move said panel an amount necessary to reduce wind noise otherwise created by said panel being in a relatively greater open position;
   a vibration sensor positioned adjacent to a roof opening for sensing said wind noise, said vibration sensor being electrically connected to said electronic control unit; and
   a fixed sunroof tub, said panel being movably coupled to said tub, said electronic control unit and said vibration sensor being mounted to said tub, said tub being free of a wind deflector.

9. The sunroof assembly of claim 8 wherein said electronic control unit:
   compares a vibration sensor created signal to a predetermined noise value;
   automatically energizes said actuator, if said electronic control unit determines that said vibration sensor created signal is greater than said predetermined noise value, in order to move said panel toward a closed position; and
   causes said actuator to constantly move said panel in response to signal difference values within at least a predetermined vehicle speed range and within predetermined panel positional ranges.

10. The sunroof assembly of claim 9 wherein said electronic control unit:
    further compares said vibration sensor created signal to said predetermined noise value; and
    automatically energizes said actuator in a reverse direction, if said electronic control unit determines that said vibration sensor created unit is less than said predetermined noise value by a predetermined amount, in order to move said panel toward said open position.

11. The sunroof assembly of claim 7 further comprising a second vibration sensor positioned adjacent to said roof opening and also being electrically connected to said electronic control unit.

12. The sunroof assembly of claim 8 wherein said panel is defined as a substantially transparent window pane closable to a substantially horizontal orientation.

13. The sunroof assembly of claim 8 further comprising a driver accessible switch manually operable for causing opening and closing of said panel.

14. The sunroof assembly of claim 8 wherein said electronic control unit repetitively senses a speed value of said automotive vehicle, compares said sensed speed value to a predetermined speed value and automatically closes said panel a predetermined amount if said sensed speed value equals said predetermined speed values.

15. The sunroof assembly of claim 8 further comprising manually adjustable means for determining wind noise sensitivity electrically connected to said electronic control unit.

16. A method of operating a control system for use in an automotive vehicle sunroof assembly having a sunroof panel, a first microphone and a second microphone, said method comprising the steps of:

(a) measuring wind buffeting noise at a front edge of a sunroof opening with said first microphone;

(b) measuring vibrations at a rear edge of a sunroof opening with said second microphone;

(c) receiving a first sensor signal from said first microphone;

(d) receiving a second sensor signal from said second microphone;

(e) determining a difference between said sensor signals;

(f) comparing said difference to a preset value; and (g) moving said sunroof panel until said signal differential is a predetermined amount less than before said movement.

17. The method of claim 16 further comprising the step of automatically closing said sunroof panel as said automotive vehicle increases speed.

18. The method of claim 16 further comprising the steps of:

(a) manually activating a driver accessible switch;

(b) manually energizing and deenergizing a sunroof actuator in response to step (a); and (c) automatically energizing and deenergizing said sunroof actuator in response to an output signal generated by an electronic control unit.

19. A sunroof assembly for an automotive vehicle, said sunroof assembly comprising:

a sunroof tub;

an electric motor;

circuit means electrically connected to said motor;

a microphone electrically connected to said circuit means;

a driver accessible switch electrically connected to said circuit means; and an electronic control unit causing energization of said motor in response to receipt of a signal from at least one device consisting of said switch and said microphone, said electronic control unit being mounted on said sunroof tub.

* * * * *

UNITED STATES PATENT AND TRADEMARK OFFICE
CERTIFICATE OF CORRECTION

PATENT NO. : 5,734,727
DATED : March 31, 1998
INVENTOR(S) : B. Michael Flaherty; William C. Brown It is certified that error appears in the above-indentified patent and that said Letters Patent is hereby corrected as shown below:

On the Title Page, under U.S. Patent Documents, reference 4,862,750, "Mice" should be -- Nice --.

Column 4, line 6, "buffering" should be -- buffeting --.

Column 4, line 61, "present" should be -- preset --.

Signed and Sealed this

Eleventh Day of August 1998

Attest:

BRUCE LEHMAN

*Attesting Officer*     *Commissioner of Patents and Trademarks*